(12) United States Patent
Thomas (10) Patent No.: US 10,781,965 B2
(45) Date of Patent: Sep. 22, 2020

(54) PORTABLE STORAGE ASSEMBLY

(71) Applicants: Shane Thomas, Queensland (AU);
Manning Puggioni, Queensland (AU)

(72) Inventor: Shane Thomas, Queensland (AU)

(73) Assignees: Shane Thomas, Queensland (AU);
Manning Puggioni, Queensland (AU)

( * ) Notice: Subject to any disclaimer, the term of this patent is extended or adjusted under 35 U.S.C. 154(b) by 0 days.

(21) Appl. No.: 15/401,439

(22) Filed: Jan. 9, 2017

(65) Prior Publication Data
US 2017/0198857 A1 Jul. 13, 2017

(30) Foreign Application Priority Data

Jan. 11, 2016 (AU) .............................. 2016200150

(51) Int. Cl.
| | | |
|---|---|---|
| *F16M 11/00* | (2006.01) | |
| *F16M 11/32* | (2006.01) | |
| *F16M 11/34* | (2006.01) | |
| *H02J 7/35* | (2006.01) | |
| *F16M 11/38* | (2006.01) | |
| *H02S 20/30* | (2014.01) | |
| *A45B 11/00* | (2006.01) | |
| *A47B 3/04* | (2006.01) | |
| *A47G 23/02* | (2006.01) | |
| *B65D 25/24* | (2006.01) | |
| *B65D 30/00* | (2006.01) | |
| *A47B 13/08* | (2006.01) | |
| *A45B 23/00* | (2006.01) | |
| *A47B 37/04* | (2006.01) | |
| *G03B 17/56* | (2006.01) | |
| *H02J 7/00* | (2006.01) | |

(52) U.S. Cl.
CPC .............. *F16M 11/32* (2013.01); *A45B 11/00* (2013.01); *A47B 3/04* (2013.01); *A47G 23/0225* (2013.01); *B65D 25/24* (2013.01); *B65D 29/00* (2013.01); *F16M 11/34* (2013.01); *F16M 11/38* (2013.01); *H02J 7/35* (2013.01); *H02S 20/30* (2014.12); *A45B 2023/0006* (2013.01); *A45B 2023/0012* (2013.01); *A47B 13/088* (2013.01); *A47B 37/04* (2013.01); *G03B 17/561* (2013.01); *H02J 7/0044* (2013.01)

(58) Field of Classification Search
CPC ...... F16M 11/38; F16M 11/16; F16M 11/242; F16M 11/245; F16M 11/34; F16M 11/32
USPC ................ 248/166, 434, 435, 463, 168, 169
See application file for complete search history.

(56) References Cited

U.S. PATENT DOCUMENTS

| | | | |
|---|---|---|---|
| 2,621,007 A | 12/1952 | Barbin | |
| 4,017,049 A * | 4/1977 | Albee, Jr. .............. | A47B 97/08 248/464 |
| 5,337,996 A * | 8/1994 | Kalish .................... | A47B 97/04 248/448 |
| 5,404,280 A * | 4/1995 | Greek ................... | F21V 33/008 362/191 |
| 5,722,717 A | 3/1998 | Rettenberger | |

(Continued)

*Primary Examiner* — Steven M Marsh
(74) *Attorney, Agent, or Firm* — Wegman Hessler (57) ABSTRACT

The present invention is directed to a portable storage assembly including a plurality of poles, a support attachable to each of the poles and a storage container mountable to the support; wherein in use the poles are positioned to intersect forming an apex in an upper section and a wide base in a lower section, the storage container is positionable within the space defined by the poles in the lower section.

21 Claims, 14 Drawing Sheets

(56) References Cited

U.S. PATENT DOCUMENTS

| | | | |
|---|---|---|---|
| 6,736,358 B2 | 5/2004 | Johnson | |
| 8,894,146 B2 * | 11/2014 | Denike | A62B 25/00 297/232 |
| 2002/0011196 A1 * | 1/2002 | Floyd, II | A47B 23/02 108/157.16 |
| 2010/0166412 A1 * | 7/2010 | Rix | G03B 17/00 396/427 |
| 2012/0080393 A1 * | 4/2012 | Eisman | A47B 43/00 211/86.01 |
| 2014/0132037 A1 | 5/2014 | Niemela | |

* cited by examiner

PORTABLE STORAGE ASSEMBLY

FIELD OF INVENTION

The present invention relates to a portable assembly for the temporary storage of goods. The present invention has particular but not exclusive application for use while camping, on a picnic or at the beach. Reference to the assembly at the beach is provided by way of example but the invention is not limited to this use.

BACKGROUND OF THE INVENTION

When a person is at the beach, they generally discard their clothes, towel, valuables and drink on the sand when they venture for a swim in the sea. The items are generally not secure, often become contaminated with sand and are exposed to the weather elements and encroaching tide.

Chairs with storage compartments have been developed to provide a space for storage of clothes and other items. U.S. Pat. No. 5,722,717 discloses a collapsible seat with a storage compartment below the seat cover. A person sitting on the seat can access the storage compartment from the top side of the seat. In US2014/0132037 there is described a collapsible stool with a drawer that can be extended from one side of the stool and below the seat cover. Both these seats were described to be useful on picnics and camping.

An alternative approach has been the development of a stand on which holders and trays have been mounted and arranged to suit a particular purpose. U.S. Pat. No. 2,621,007 is a stand comprising a stake with a sectional tray mounted near its top. The post arrangement described in U.S. Pat. No. 6,736,358 is a stand with a number of modular components including lantern holder, toilet roll holder, tray, garbage bag support and basket.

Each of these solutions have their limitations. Chairs with storage compartments have limited storage capacity. Chairs with storage compartments cannot also hold other items whereas stands have limited capacity to store items.

OBJECT OF THE INVENTION

It is an object of the present invention to provide an alternative portable storage assembly that overcomes at least in part one or more of the above mentioned problems.

SUMMARY OF THE INVENTION

In one aspect the present invention broadly resides in a portable storage assembly including
  a plurality of poles;
  a support attachable to each of the poles; and
  a storage container mountable to the support; wherein in use the poles are positioned to intersect forming an apex in an upper section and a wide base in a lower section, the storage container is positionable within the space defined by the poles in the lower section.

Preferably there are 4 poles. In alternate embodiments there are configurations of 3, 5 or more poles.

The poles are preferably made of fiber glass, plastics, wood, metal or other suitable material. Each of the poles preferably comprise two or more parts. The pole parts preferably connect via complementary male and female ends to form a continuous pole. In a preferred embodiment the pole parts of each pole are associated by a joining cord so that the parts of each pole are proximal to each other.

One or more of the poles can be telescopically extendable.

In use the poles can cross over continuing upward from their intersection that forms the apex. Alternately and preferably the poles intersect at their upper end to form the apex. Preferably the poles are connected at the apex. The connection at the apex can be by fasteners or use of a head cap means.

The support is preferably fixable to each of the poles so that it is substantially horizontal. The support can be disassembled into different parts. Preferably parts of the support are pivotally attached via fasteners. Preferably each pole has a support fixed at substantially the same position from the lower end of the pole.

The storage container is preferably a fabric bag with at least one opening. The at least one opening is preferably at the top of the storage container. There can be an additional opening in the storage container in one of the sides of the storage container. The top perimeter of the storage container is preferably mounted to the support. The storage container is preferably square or rectangular in shape. Preferably each lower corner of the storage container is attached to the adjacent pole to prevent unintentional movement. The storage container can preferably store a variety of goods including personal possessions, clothes, towels, footwear, hats, food, picnic items and other similar items.

In one preferred option there is a head cap that has one or more hangers extending therefrom. The one or more hangers preferably provide the facility to hang items such as clothes, hats, towels and the like. The head cap in another form provides a mount to hold a camera, a video camera, speaker(s), solar panel, phone or tablet recharging station, an umbrella, a shade cover, and the like.

In a preferred embodiment the top of the storage container allows the positioning of a tabletop thereon. In a preferred option there is a table top mountable onto the storage container.

In a further preferred option one or more cup holders can be attached to one or more of the poles. Preferably the one or more cup holders are attached to a pole at or adjacent the position where the storage container is attached.

Preferably the portable storage assembly can be quickly and easily assembled and disassembled and reduced to a relatively small size for storage purposes.

In a further aspect the invention resides in a portable storage assembly including
  four poles each of which comprise of a plurality of parts;
  a support attachable to each of the poles, wherein the support is attachable at substantially the same position on each of the poles; and
  a fabric storage container mountable to the support;
wherein in use the poles are positioned to intersect forming an apex in an upper section and a wide base in a lower section, the storage container is positionable within the space defined by the poles in the lower section.

Preferably the portable storage assembly has four poles each of which comprise of a plurality of parts; the support is attachable at substantially the same position on each of the poles; the storage container is a waterproof fabric container mountable to the support; and the upper end of the poles are attached together by a head cup arrangement.

Preferably the portable storage assembly has a mount to hold hangers, a camera, a video camera, speaker(s), solar panel, light, beacon, phone or tablet recharging station, an umbrella, a shade cover, and other similar accessories.

More preferably the portable storage assembly has a table top mountable onto the storage container and or the positioning of cup holders on one or more of the poles.

The features described with respect to one aspect also apply where applicable to all other aspects of the invention. Furthermore different combinations of described features are herein described and claimed even when not expressly stated.

BRIEF DESCRIPTION OF THE DRAWINGS

In order that the present invention can be more readily understood reference will now be made to the accompanying drawings which illustrate a preferred embodiment of the invention and wherein.

DETAILED DESCRIPTION OF THE PREFERRED EMBODIMENT

Figure 1:
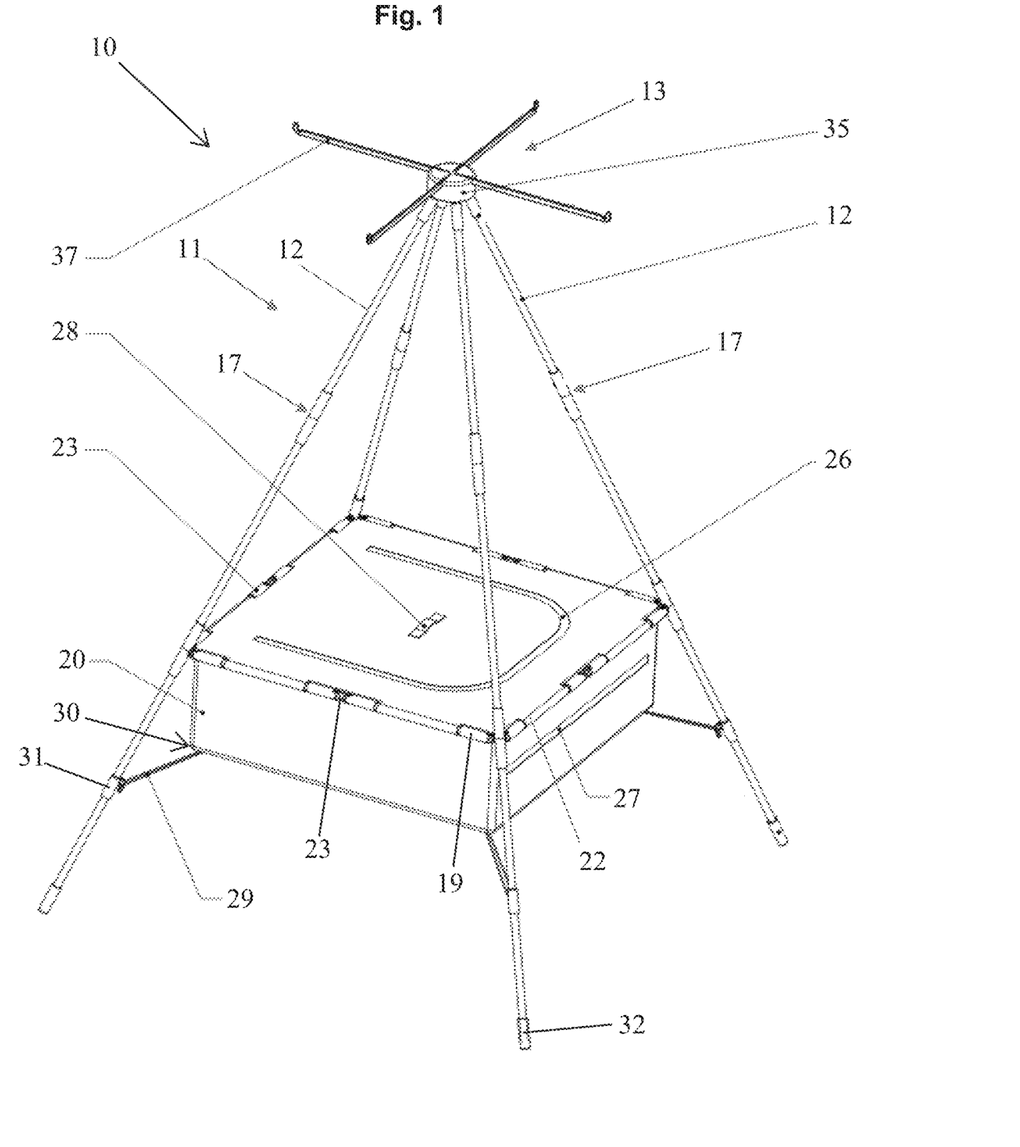
FIG. 1 is a diagrammatic view of the temporary storage assembly of the preferred embodiment of the invention.
Figure 3:
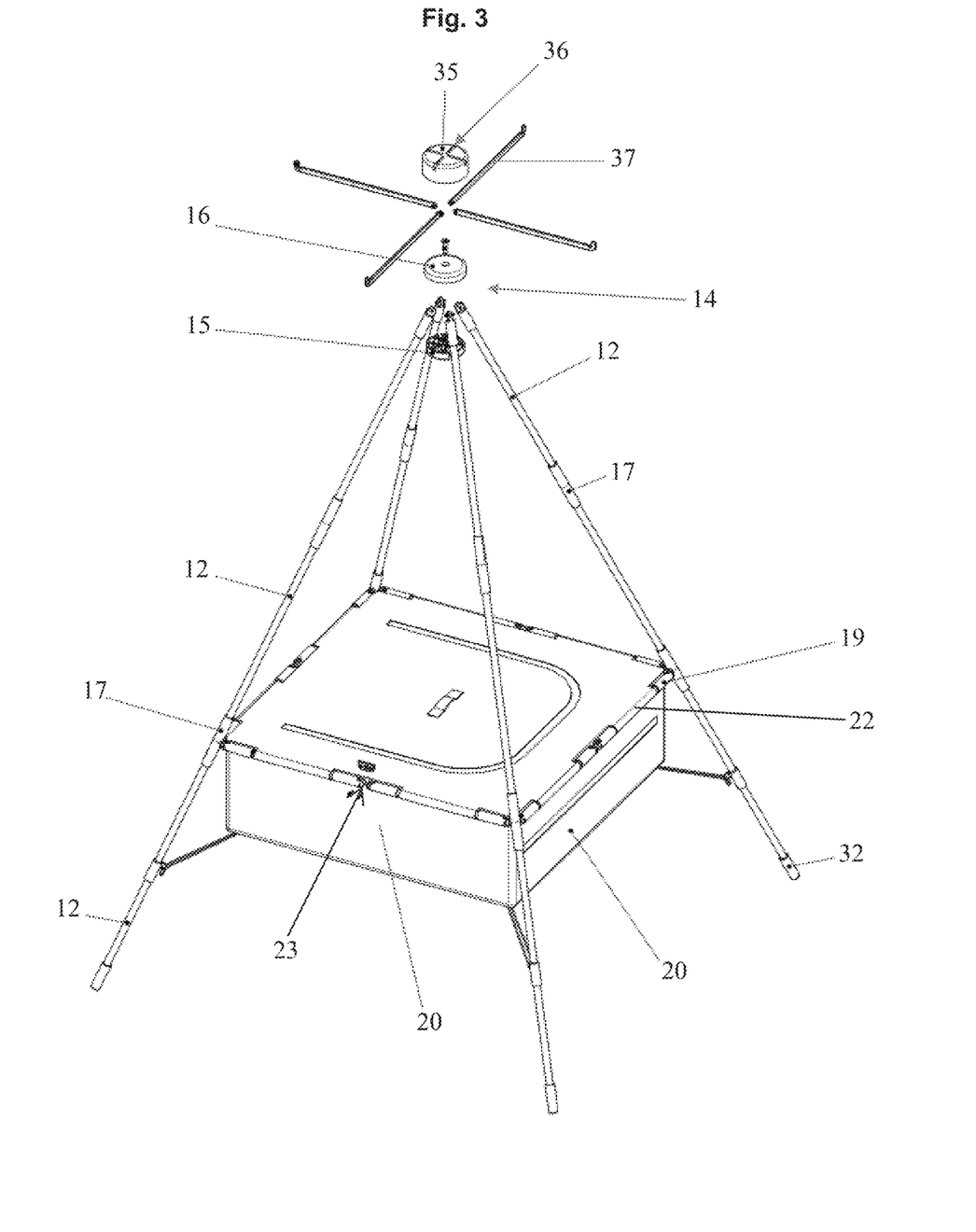
FIG. 3 is a partially exploded view of the temporary storage assembly.
Figure 4:
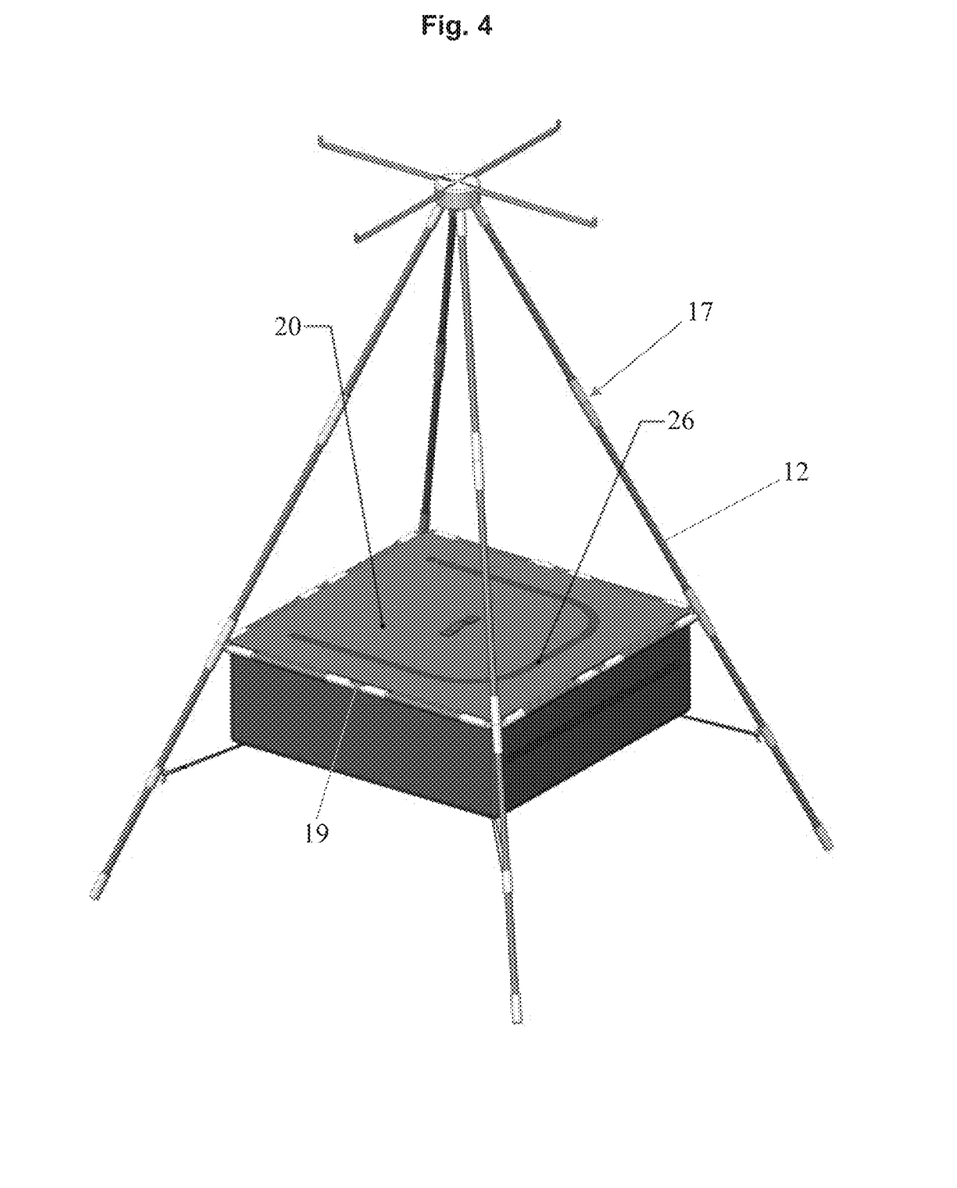
FIGS. 4 to 9 are a series of figures showing the disassembly of the temporary storage assembly.
Figure 5:
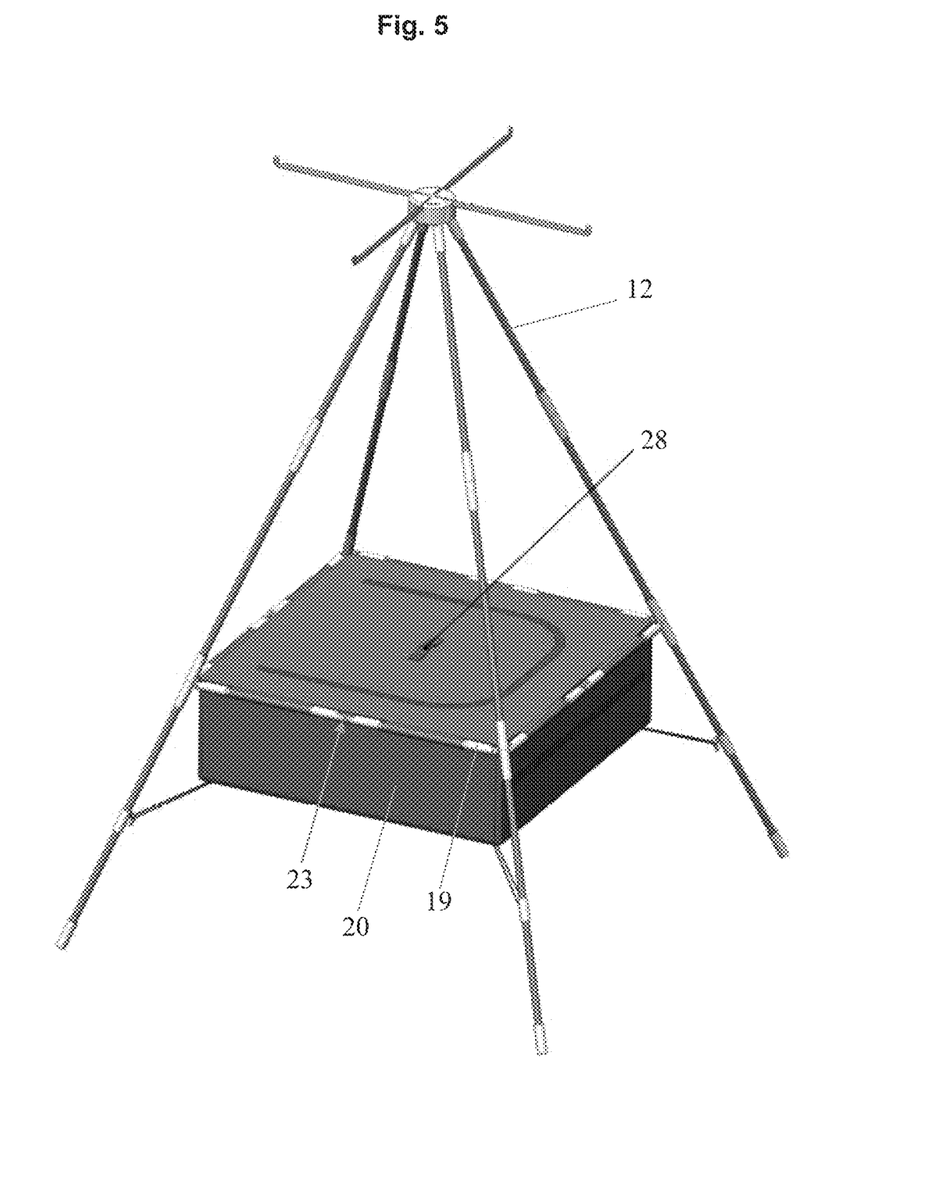
Figure 6:
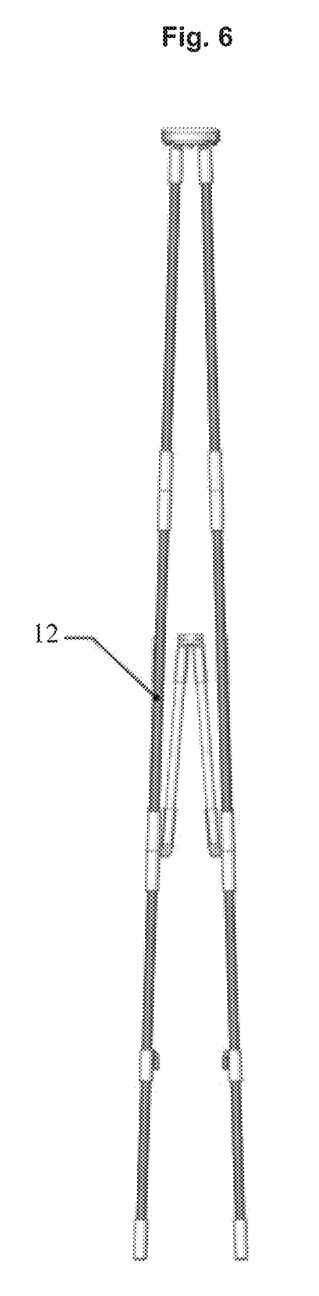
Figure 7:
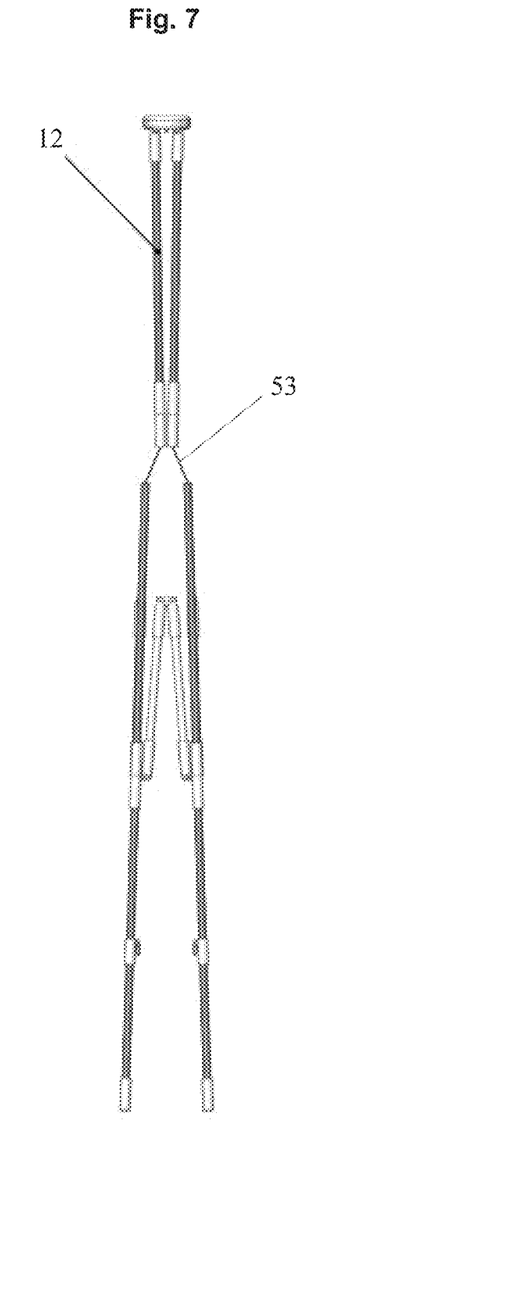
Figure 8:
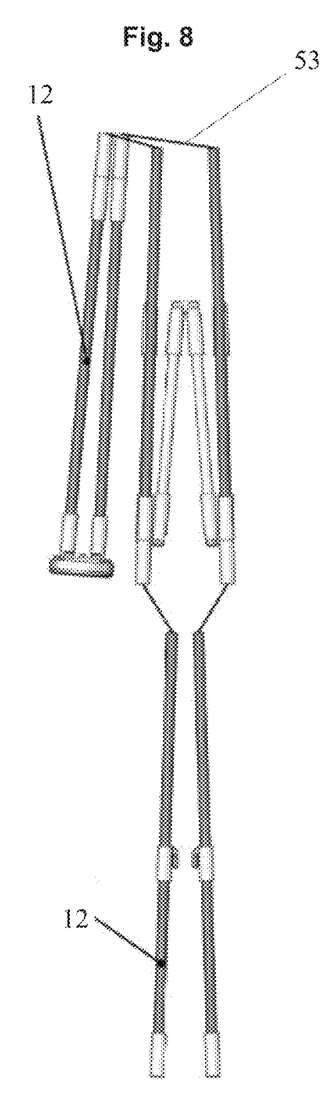
Figure 9:
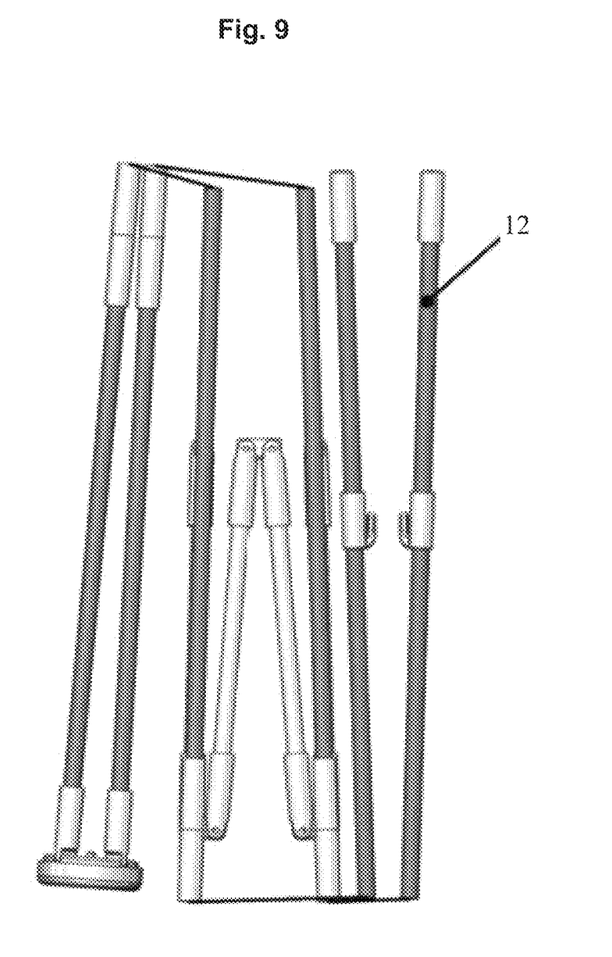

With particular references to FIGS. 1 and 3, there is shown the portable storage assembly 10 having a frame 11 comprising of four individual poles 12. The poles 12 are positioned in use to substantially form a pyramid with the upper end coming together to form an apex 13. The apex 13 with each of the upper ends of poles 12 are held together by a fastening cap head arrangement 14. The fastening cap head arrangement 14 includes a base cap 15 and a top cap 16 which when fitted together fixed the position of the poles 12.

Each of the poles 12 compromise several parts that can be disassembled in order to fold and store the assembly. Each part of the pole is associated with its adjacent part by a connecting cord 53. In this way the parts are not lost and can be quickly assembled to form a functional pole 12. Adjoining pole parts are connected together via opposing male and female pole part ends 17.

Each pole 12 is connected to their adjacent poles 12 by two pivotally connected support arms 19. The storage container 20 is mounted to the support arms 19. Each support arm 19 is pivotally connected to the pole 12 by means of a fastener. Each support arm 19 comprises of two parts that are pivotally connected approximately midway between the poles 12 by fasteners 23. The pivotally connected support arms 19 are attached to each pole 12 at substantially the same position from the base of the poles 12. The pivotally connected support arms 19 are positioned through peripheral loops 22 surrounding the upper perimeter of the storage container 20. The storage container 20 is a water-proof fabric container that is substantially square in shape. The storage container 20 has a top zip opening 26 and a side zip opening 27. There is also a center tab 28 for disassembling the portable storage assembly. While the storage container 20 is fixed to each of the poles 12 there is an elastic tie 29 extending from each lower corner 30 of the storage container 20. The elastic tie 29 extends from the corner 30 and attaches to a hook 31 on each of the poles 12. Each of the poles 12 has a foot 32 to provide stability and additional strength.

The storage container 20 enables clothes, hats and valuables to be stored therein. The storage container 20 can also include an internal secret compartment for the securing of valuables.

A mounting cap 35 can be placed over the cap head arrangement 14 that forms the apex 13. The mounting cap 35 has a plurality of channels 36 in a top surface through which hanger arms 37 are located. The hanger arms 37 allows clothes, bags, hats and other items to hang from the extended arms.

Figure 10:
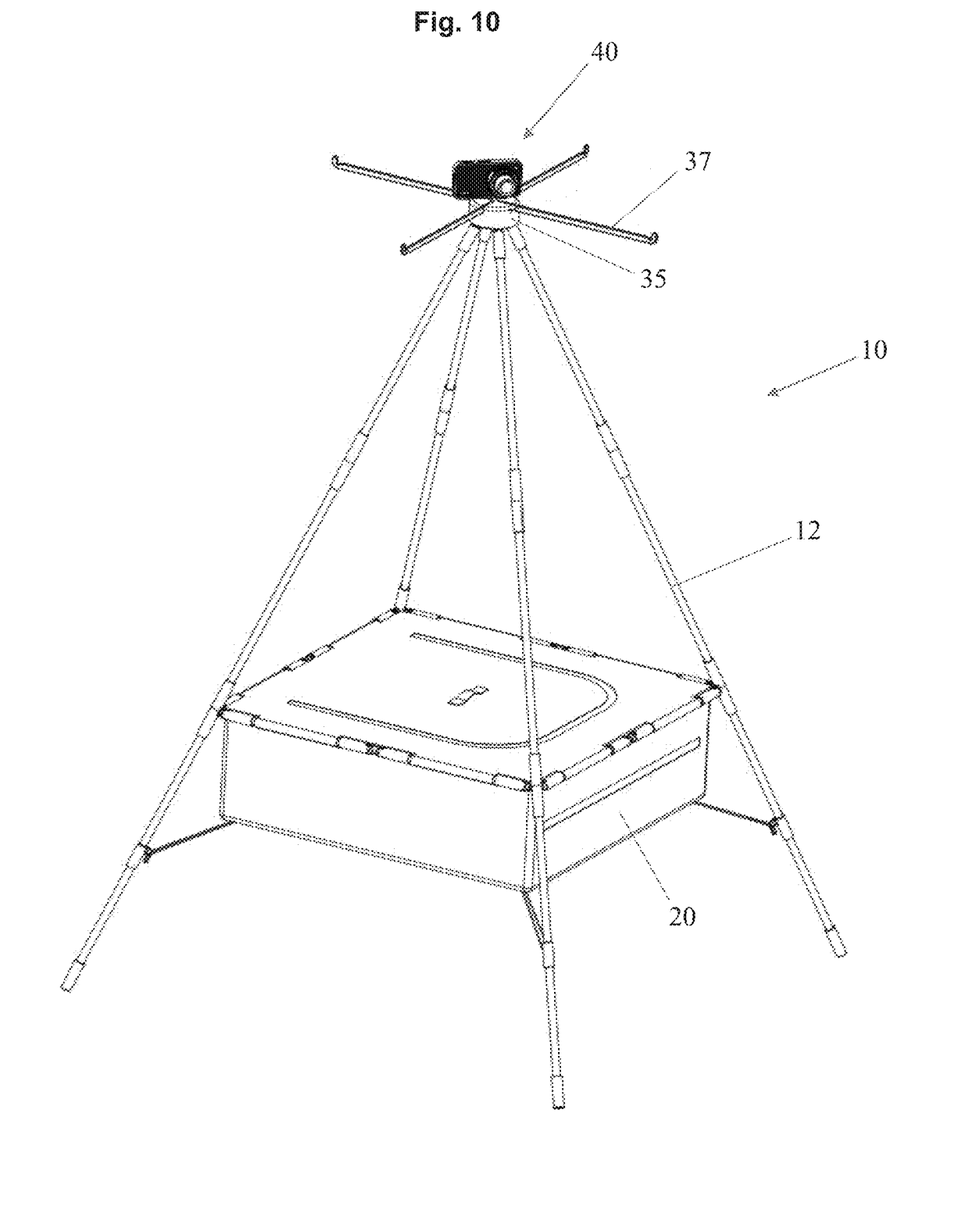
FIG. 10 is a diagrammatic view of the temporary storage assembly with an optional camera mounting.
Figure 11:
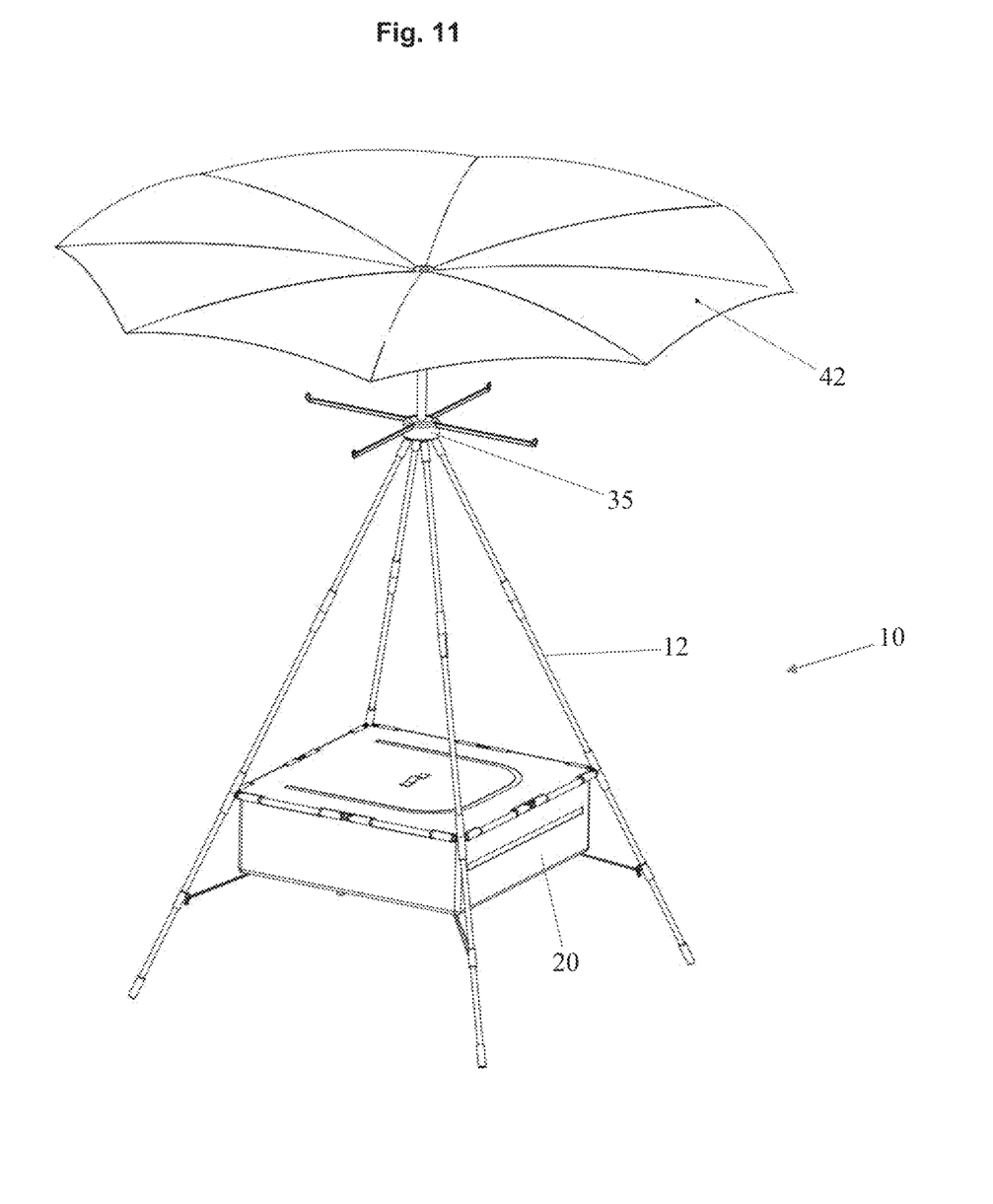
FIG. 11 is a diagrammatic view of the temporary storage assembly with a mounted umbrella.

With particular reference to FIG. 10, there is shown a camera 40 mounted to the mounting cap 35. The mounting cap 35 has the preferred ability to enable the mounting of a camera (as shown in FIG. 10); video camera; speakers; beacon; solar panel; light; phone, tablet or laptop chargers; and umbrella 42 (as shown in FIG. 11).

Figure 12:
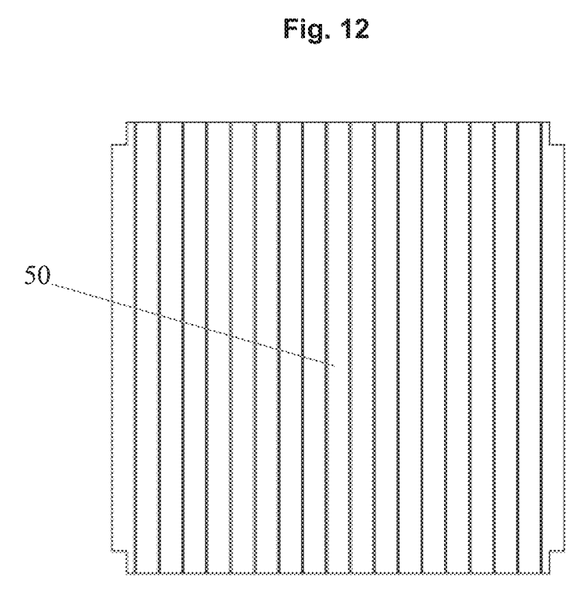
FIG. 12 is a diagrammatic view showing a table top for positioning on the storage container.
Figure 13:
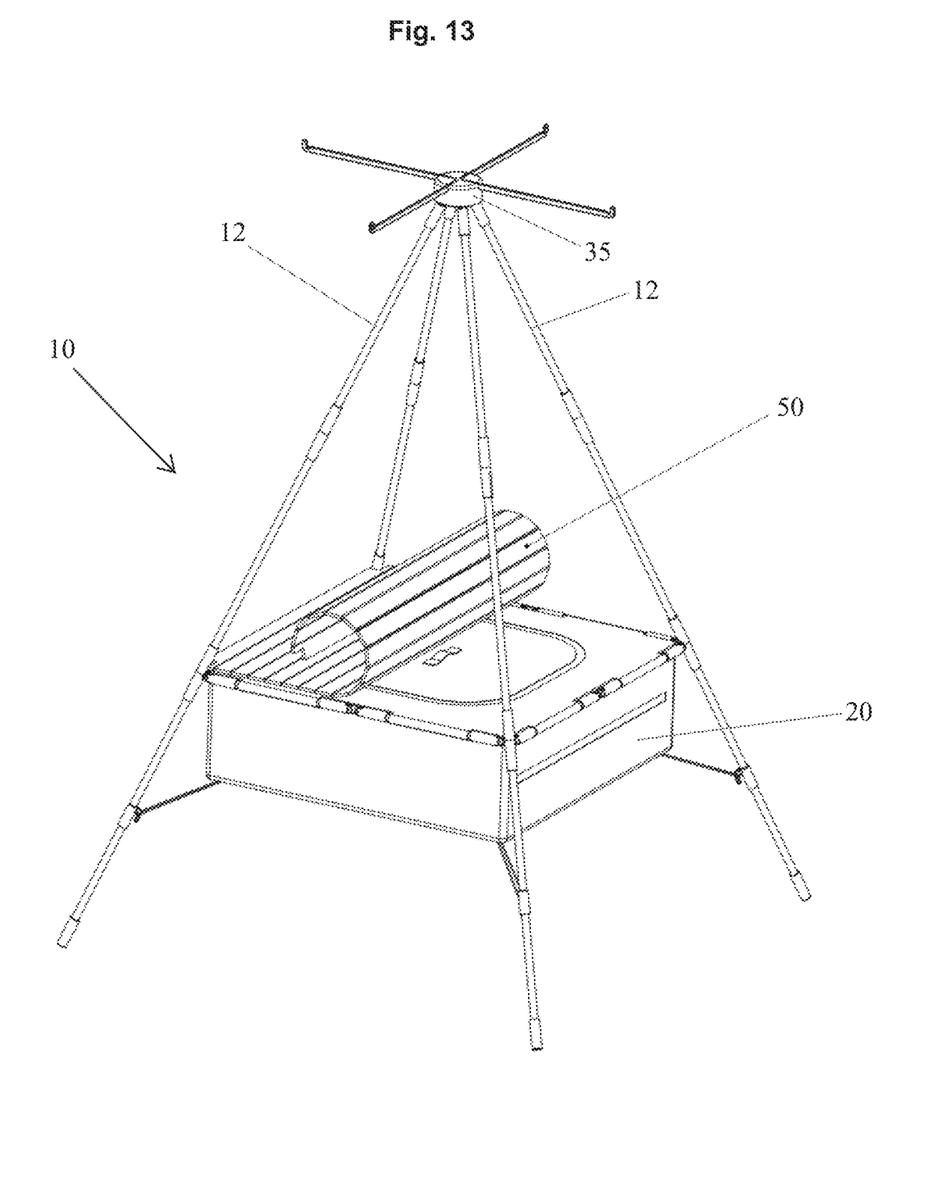
FIG. 13 is a diagrammatic view of positioning the table top on the storage compartment of the temporary storage assembly.
Figure 14:
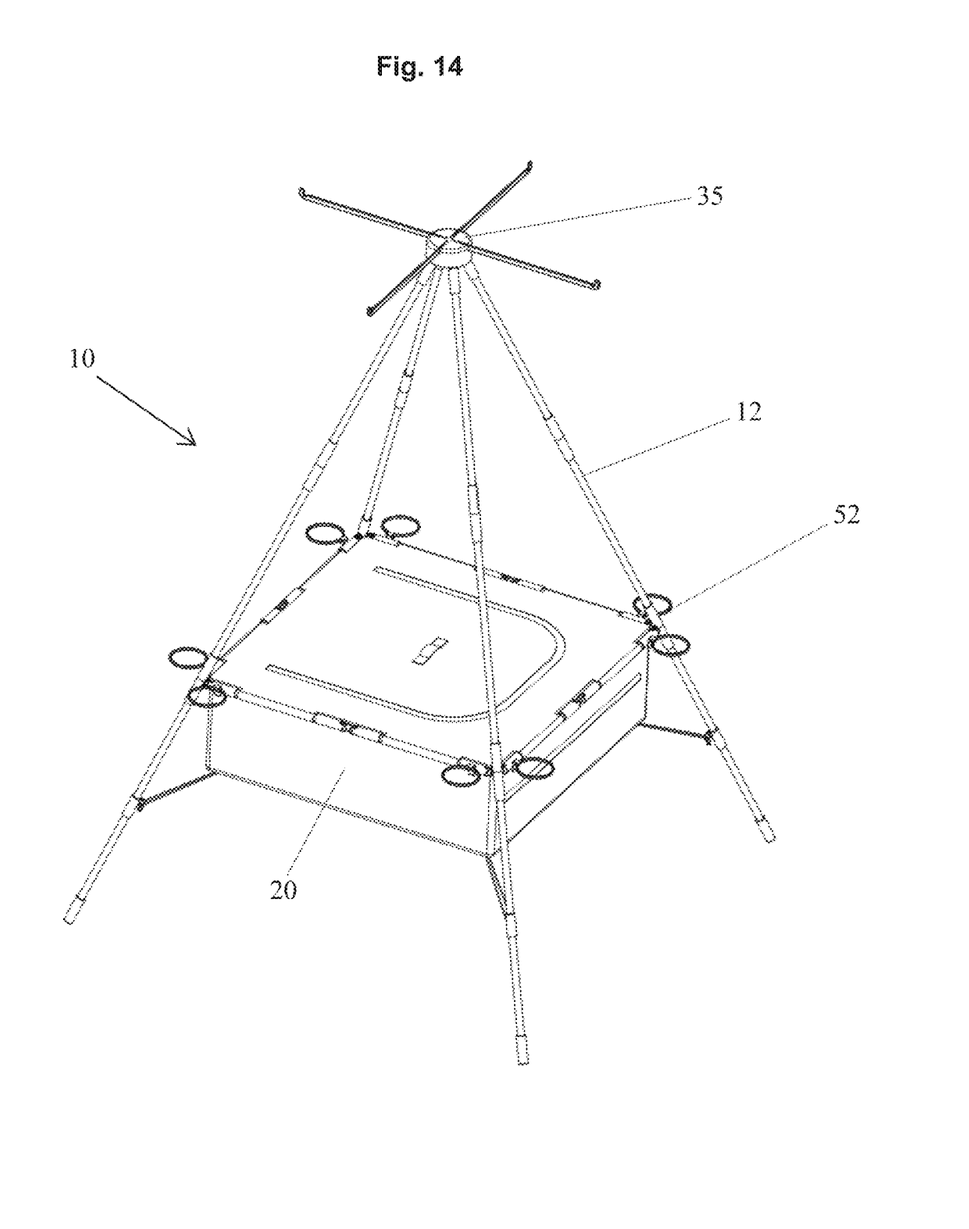
FIG. 14 is a diagrammatic view of the temporary storage assembly with cup holders.

With reference to FIGS. 12 and 13, there is a paneled tabletop 50, which can be located on top of the storage container 20 so that the portable storage assembly 10 can also serve as a table. A person may use a table for placing food, drinks, plates and cutlery rather than leaving them on the ground. With reference to FIG. 14, there is shown cup holders 52 attached to each of the poles 12. The cup holders 52 can be used in conjunction with the tabletop 50 to provide a dining arrangement.

Figure 2:
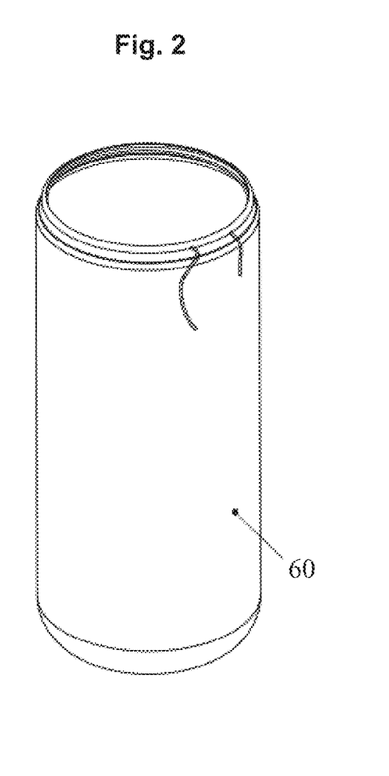
FIG. 2 is a diagrammatic view of the cover bag for holding the temporary storage assembly in a disassembled form.

With reference to FIGS. 4 to 9, there is shown various stages of disassembly to the portable storage assembly 10. Step 1 involves removing possessions from the storage container 20, removing hanger arms 37 and other accessories from the portable storage assembly 10. Unhooking the elastic ties 29 from all four corners of the storage container 20. Step 2 involves pulling up on the tab 28 so that the support arms 19 pivots adjacent pole 12 and midway via fasteners 23. In this way the storage container 20 collapses and folds around the support arms 19. The poles 12 are disassembled so that each part of the pole 12 is able to fold back on itself while remaining connected via cords 53. FIGS. 6 to 9 show the disassembly of the poles 12 (and without the storage compartment 20 for ease of illustration purposes). The folded pole parts and storage compartment 20 are then placed in cover 60 shown in FIG. 2. To reassemble the portable storage assembly 10, the steps are reversed.

Advantages

The preferred embodiment of the portable storage assembly 10 has the advantage that it is relatively quick and easy to assemble and disassemble, provide ample storage for clothes, towels and other possessions, form a table and a temporary dining arrangement and can provide shade to those sitting around the portable storage assembly 10.

The preferred embodiment of the portable storage assembly 10 enables possessions and food to remain off the ground thereby avoiding contamination and invasion by ants and other insects.

VARIATIONS

It will of course be realised that while the foregoing has been given by way of illustrative example of this invention, all such and other modifications and variations thereto as would be apparent to persons skilled in the art are deemed to fall within the broad scope and ambit of this invention as is herein set forth.

Throughout the description and claims of this specification the word "comprise" and variations of that word such as "comprises" and "comprising", are not intended to exclude other additives, components, integers or steps.

The invention claimed is:

1. A portable storage assembly including four poles;
four supports, each support pivotally connected between two adjacent poles; and
a storage container mountable to the support;
wherein the four poles are positioned to intersect forming an apex in an upper section and a wide base in a lower section, the storage container is positionable within a space defined by the poles in the lower section, and each support connects to two adjacent poles,
wherein each support pivots an adjacent pole such that each pole is able to fold back on itself while remaining connected.

2. A portable storage assembly as claimed in claim 1, wherein each of the four poles comprise of a plurality of parts and the pole parts of each of the four poles connect via complementary male and female ends to form a continuous pole.

3. A portable storage assembly as claimed in claim 2, wherein the pole parts of each of the four poles are associated by a joining cord so that the parts of each pole are proximal to each other.

4. A portable storage assembly as claimed in claim 1, wherein each of the four poles are telescopically extendable.

5. A portable storage assembly as claimed in claim 1, wherein in use the support is attachable at the same position on each of the poles.

6. A portable storage assembly as claimed in claim 1, wherein in use the support is fixed to each of the poles so that the support is horizontal.

7. A portable storage assembly as claimed in claim 1, wherein the storage container is a waterproof fabric container mountable to the support.

8. A portable storage assembly as claimed in claim 1, wherein in use a top perimeter of the storage container is mounted to the support.

9. A portable storage assembly as claimed in claim 1, wherein the storage container is square or rectangular in shape.

10. A portable storage assembly as claimed in claim 1, wherein in use each lower corner of the storage container is attached to an adjacent one of the plurality of poles to prevent unintentional movement.

11. A portable storage assembly as claimed in claim 1, wherein in use, the poles intersect at their upper end to form an apex.

12. A portable storage assembly as claimed in claim 1, wherein in use an upper end of the poles are attached together by a head cup arrangement.

13. A portable storage assembly as claimed in claim 1, wherein in use an upper end of the poles are attached together by a head cup arrangement and one or more hangers extend from the head cup arrangement.

14. A portable storage assembly as claimed in claim 1, wherein there is a mount to hold hangers, a camera, a video camera, speaker(s), solar panel, light, beacon, phone or tablet recharging station, an umbrella, a shade cover, and other similar accessories.

15. A portable storage assembly as claimed in claim 1, wherein there is a table top mountable onto the storage container.

16. A portable storage assembly as claimed in claim 1, wherein there are cup holders on one or more of the poles.

17. A portable storage assembly as claimed in claim 1, wherein the four poles each comprise of a plurality of parts; the support is attachable at substantially the same position on each of the poles; the storage container is a waterproof fabric container mountable to the support; and the upper end of the poles are attached together by a head cup arrangement.

18. A portable storage assembly as claimed in claim 17, wherein there is a mount to hold hangers, a camera, a video camera, speaker(s), solar panel, light, beacon, phone or tablet recharging station, an umbrella, a shade cover, and other similar accessories.

19. A portable storage assembly as claimed in claim 17, wherein there is a table top mountable onto the storage container and one or more cup holders on the poles.

20. A portable storage assembly as claimed in claim 1, wherein in use the supports are positioned through peripheral loops surrounding an upper perimeter of the storage container to mount the storage container to the supports.

21. A portable storage assembly as claimed in claim 1, wherein each support comprises two parts that are pivotally connected approximately midway by fasteners.

* * * * *